(12) United States Patent
Moore

(10) Patent No.: US 12,408,603 B2
(45) Date of Patent: Sep. 9, 2025

(54) VERTICAL FARMING APPARATUS AND A METHOD OF VERTICAL FARMING

(71) Applicant: Agriculture Investments Limited, Sittingbourne (GB)

(72) Inventor: David James Moore, Sittingbourne (GB)

(*) Notice: Subject to any disclaimer, the term of this patent is extended or adjusted under 35 U.S.C. 154(b) by 0 days.

(21) Appl. No.: 17/459,068

(22) Filed: Aug. 27, 2021

(65) Prior Publication Data

US 2022/0071111 A1   Mar. 10, 2022

(30) Foreign Application Priority Data

Sep. 7, 2020 (GB) ........................... 2014046
May 21, 2021 (GB) ........................... 2107294

(51) Int. Cl.
*A01G 27/00* (2006.01)
*A01G 9/02* (2018.01)

(52) U.S. Cl.
CPC ........... *A01G 27/005* (2013.01); *A01G 9/023* (2013.01)

(58) Field of Classification Search
CPC ....................................................... A01G 9/023
See application file for complete search history.

(56) References Cited

U.S. PATENT DOCUMENTS

| 10,010,031 B1* | 7/2018 | Liu .......................... A01G 25/06 |
| 2009/0183427 A1 | 7/2009 | Dimaggio |
| 2011/0005131 A1 | 1/2011 | Smits |
| 2011/0120000 A1* | 5/2011 | Ogilvie .................. A01G 13/02  47/31.1 |
| 2013/0145690 A1* | 6/2013 | Cannon .................... A01G 9/02  47/66.7 |

(Continued)

FOREIGN PATENT DOCUMENTS

| CN | 105935038 A | 9/2016 |
| CN | 206481676 U | 9/2017 |

(Continued)

OTHER PUBLICATIONS

Benedetti', Arnaud, "Examiner", Jan. 19, 2022, 22 Pages.

(Continued)

*Primary Examiner* — Joshua J Michener
*Assistant Examiner* — Henry Hooper Mudd
(74) *Attorney, Agent, or Firm* — Blanchard Horton PLLC

(57) ABSTRACT

A vertical farming apparatus comprises a frame for supporting plant troughs or pots, a base for supporting the frame, and an array of gutters supported by the frame. The array of gutters comprises an upper formation of gutters above a lower formation of gutters. Containers for housing plants are supported by and arranged to drain into a gutter in the array of gutters. An irrigation system is arranged to irrigate the containers. The lower formation of gutters is arranged in a tiered configuration such that each gutter in the lower formation is at least partially offset in a first horizontal direction from the other gutters in the lower formation and is at least partially offset in a first horizontal direction from the gutters in the upper formation. A supply system is arranged to supply gaseous carbon dioxide, air and mixtures of carbon dioxide and air to the containers interchangeably.

18 Claims, 6 Drawing Sheets

(56) References Cited

U.S. PATENT DOCUMENTS

| | | | |
|---|---|---|---|
| 2015/0068121 A1 | 3/2015 | Probst et al. | |
| 2015/0150198 A1 | 6/2015 | Sinha | |
| 2018/0035627 A1* | 2/2018 | Williams | A01G 31/06 |
| 2018/0125016 A1 | 5/2018 | Dufresne | |
| 2018/0368346 A1* | 12/2018 | Watson | A01G 31/06 |
| 2020/0359568 A1 | 11/2020 | Twito | |
| 2021/0100180 A1* | 4/2021 | Van Buuren | A01G 31/016 |
| 2021/0112728 A1* | 4/2021 | Fonseca dos Reis | A01G 9/029 |
| 2021/0185947 A1* | 6/2021 | Crawford | A01G 27/00 |
| 2021/0267133 A1* | 9/2021 | Belanger | A01G 7/02 |
| 2022/0256790 A1* | 8/2022 | Kaplita | A01G 31/04 |
| 2022/0322611 A1* | 10/2022 | Woolbright | A01G 9/02 |
| 2023/0067922 A1* | 3/2023 | Kendall | A01K 25/02 |

FOREIGN PATENT DOCUMENTS

| | | |
|---|---|---|
| CN | 206641061 U | 11/2017 |
| CN | 207383197 U | 5/2018 |
| CN | 108307860 A | 7/2018 |
| CN | 208338548 U | 1/2019 |
| CN | 108040671 A | 6/2020 |
| CN | 112493112 A | 3/2021 |
| CN | 213343818 U | 6/2021 |
| EP | 3692784 A1 | 6/2021 |
| GB | 1096956 A | 12/1967 |
| GB | 2494997 A | 3/2013 |
| GB | 2598727 A1 | 3/2022 |
| JP | 2002330624 A | 11/2002 |
| JP | 2007167033 A | 11/2011 |
| JP | 2012170505 A | 4/2013 |
| JP | 3202251 U | 1/2016 |
| JP | 2019118282 A | 1/2022 |
| KR | 102002320 B1 | 8/2019 |
| RU | 2084123 C1 | 7/1997 |
| WO | 9854947 A2 | 12/1998 |
| WO | 2013170361 A1 | 11/2013 |
| WO | 2019155469 A1 | 8/2019 |

OTHER PUBLICATIONS

Yates, Hayley, "Patent Search Report GB2014046.3", Claims Searched 1-25, Feb. 21, 2021, 2.

Yates, Hayley, "Patent Search Report GB2107294.7", Claims Searched 1-5, 7-16, 18-22, 24-25, Nov. 11, 2021, 2.

Vasl, Robert, "International Search Report", Israel Patent Office, Appication No. PCT/IL2019/050153, May 30, 2019, 5 pages.

Yates, Hayley, "Examination Report under Section 18(3)".

\* cited by examiner

VERTICAL FARMING APPARATUS AND A METHOD OF VERTICAL FARMING

CROSS-REFERENCE TO RELATED APPLICATIONS

This application claims priority under the Paris Convention to United Kingdom Patent Application Number GB 2014046.3, filed on Sep. 7, 2020, and United Kingdom Patent Application Number GB 2107294.7, filed on May 21, 2021. The contents of each of these applications are incorporated herein by reference.

FIELD OF INVENTION

The present invention relates to a vertical farming apparatus and, in particular, to a vertical farming apparatus comprising a frame, gutters, containers, an irrigation system and a supply system for suppling gas.

BACKGROUND

The use of vertical, hydroponic and intensive growth farming systems for the farming of certain crops, and in particular, fruit, salads and vegetable produce, has grown over recent years. These systems often aim to improve the farming and cultivation of fruits or vegetables by increasing growth of the produce, improving yield of the produce, making the harvesting of the produce easier and/or reducing the costs of the produce by, for example, reducing the land usage or labor requirements. Additionally, these farming systems may allow for the production of certain vegetables, salads and fruits in climates and environments where it would be challenging to grow them economically using traditional or standard farming methods.

One system used in this field involves placing the fruit, salads or vegetable plants on tables within a grow house or glasshouse or placing the plants in gutters that are suspended from the roof of the grow house or glasshouse. This advantageously makes harvesting produce easier and quicker as the plants and their produce are raised off the ground. However, such systems do not substantially reduce the production costs of the fruit and vegetable produce, as they do not typically increase the density of plants per unit area and therefore reduce the land usage.

Another system that is sometimes used to grow fruit, salads and vegetables is to stack plant pots or troughs in vertical columns with spacers in between each pot or trough. Stacking the plant troughs or pots vertically significantly increases the plant density per unit area, thereby reducing land usage and its associated costs. However, there are a number of significant drawbacks associated with stacking plants in vertical columns. First, the sunlight received by the plants in the lower portion of the column is often considerably less than the sunlight received by the plants in the upper portion of the column, as the trough or pots and plants above block their sunlight. This can cause varying levels of growth and ripening in a single column. Secondly, vertical columns are usually watered and fed by watering the topmost plant. The water and fertiliser is then allowed to trickle or seep downwards through each layer of the column sequentially via gravity. This can result in asymmetric growth of plants in a column due to the uneven and top heavy distribution of water and nutrients. Thirdly, the spacers that allow one plant pot or trough to be stacked on top of another typically impede sunlight and airflow around the plants. To overcome the problem of the spacer, complex systems are used to simulate airflow and circulation around the plants in the column.

Objects and aspects of the present invention seek to alleviate at least these problems with the prior art.

BRIEF SUMMARY OF THE INVENTION

According to a first aspect of the present invention there is provided a vertical farming apparatus, the apparatus comprising a frame for supporting plant troughs or pots, a base for supporting the frame, an array of gutters supported by the frame, the array of gutters comprising an upper formation of gutters above a lower formation of gutters, a plurality of containers for housing plants, where each container is supported by and arranged to drain into a gutter in the array of gutters; and an irrigation system that is arranged to irrigate the containers; wherein the lower formation of gutters is arranged in a tiered configuration such that each gutter in the lower formation is at least partially offset in a first horizontal direction from the other gutters in the lower formation and is at least partially offset in a first horizontal direction from the gutters in the upper formation; said apparatus further comprising a supply system that is arranged to supply gaseous carbon dioxide, air and mixtures of carbon dioxide and air to the containers interchangeably.

In this way, an apparatus or system for vertically farming crops such as fruit, salads and vegetable plants is provided. In use, fruit, salads or vegetable plants are potted within a growth substrate in the containers that are supported by an array of gutters. The vertical farming apparatus of the present invention comprises several features that synergistically combine to provide the optimal environment for plants housed within the containers to grow.

Firstly, the tiered configuration ensures that each of the containers receives adequate light for plants to grow as discussed above. The tiered configuration and horizontal offsets of the lower formation of the array of gutters means that, in use, the plants supported on the gutters have vertical access to sunlight for increased levels of photosynthesis. This improves the growth and well-being of the crop and can result in an improved yield. Furthermore, since the tiered configuration also involves a vertical offset the plant density per unit area is increased when compared with tabletop crops or conventional farming methods. Additionally, the tiered configuration raises the crop off the ground thereby improving the ease and speed of harvesting and inspecting the crop and protecting the crop from cold or damp ground.

Secondly, the irrigation system irrigates the plants housed within the containers in use to ensure that the plants have the required amounts of water and nutrients. In this way, the water, nutrients, and food that is supplied to the plants can be closely controlled and monitored to provide the plants with the optimum environment.

Thirdly, the supply system is configured or arranged to supply both gaseous carbon dioxide, air, and mixtures thereof to the plants housed within the containers in use. In use, it is beneficial to supply gaseous carbon dioxide to the plants housed within the containers such that the plants have the required components for photosynthesis, which improves growth and crop yield. It is also beneficial to supply gas to the plants housed within the containers as, in use, the air turbulence moves the stems and leaves of the plant, which strengthens the structure of the crop, thereby improving growth and the ability to support ripening fruit. Additionally, the airflow across the leaves of the plant can cause temperature differentials to form across the leaves of the plant, which stimulate the plants natural day/night cycle by opening the stoma, thereby promoting photosynthesis. The airflow can also be used to passively, or actively, heat the plants to their preferred temperature, which can also stimulate the plants and promote growth.

Accordingly, through the combination of the above beneficial effects, the vertical farming apparatus can provide an optimal environment for growing plants, which can increase yields of the fruit, salads, or vegetables, reduce disease, accelerate growth, reduce energy consumption, and reduce land usage. Or, in other words, a key advantage of the present invention is that the vertical farming apparatus provides all of the main requirements for farming a crop with improved yield and reduced land usage.

In preferred embodiments, the supply system is configured to supply gases to each of the containers directly. More preferably, the supply system is configured to supply gases to each of the containers individually. In this way, the supply system is configured to supply the gases in close proximity to the containers, rather than a supply system that provides gases to the general vicinity of the vertical farming apparatus. Since the containers are supplied with gas directly or individually, the gas supply can be tuned to suit the individual need of the plants within each of container of plants on a specific gutter, thereby helping to provide a more optimal environment to the plants whilst simultaneously reducing the energy consumption of the supply system.

Preferably, the supply system comprises a plurality of gas conduits for supplying the gases to the containers. In use, the gas conduits supply gases to the plants housed within the containers.

Preferably, each of the gas conduits is supported by the frame. In this way, the gas conduits can be positioned proximate to the containers, and this can reduce the number of components surrounding or associated with the vertical farming apparatus.

Preferably, each of the gas conduits extends in a direction substantially parallel with the longitudinal axis of the gutters in the array of gutters. It is preferable for the gas conduits to extend in this direction in order to supply the gases more evenly along the length of the containers and gutters.

Preferably, each gas conduit is associated with a gutter in the array of gutters. "Associated with" is taken to mean that a specific gas conduit is arranged to supply gas to a specific container.

Preferably, each gas conduit is located underneath a gutter. Locating the gas conduit underneath the gutter has been found to be a beneficial position for the gas conduit such that it does not block light but is also close enough to the container such that it can supply the gasses to the containers and the plants housed therein in use.

Preferably, the gas conduits are lay flat tubes. The use of lay flat tubes is advantageous as they are relatively inexpensive and can be produced and procured at many different levels of gas permeability. In this way, the lay flat tubes can be swapped to suit the gas requirements, i.e., carbon dioxide consumption, of the crops.

Preferably, the gas conduits comprise micro holes for the egress of gas from the gas conduit. Micro holes have been found to be beneficial to ensure an even and continuous egress of gas from the gas conduits along the length of the gas conduit.

Preferably, the supply system is arranged to control the carbon dioxide level around the array of containers. Preferably, the supply system comprises a sensor that is configured to detect the levels of carbon dioxide proximate the containers. Preferably, the supply system comprises one or more sensors that are each configured to detect the levels of carbon dioxide proximate one or more containers.

Preferably, the supply system comprises a sensor that is configured to detect the airflow proximate the containers. Preferably, the supply system comprises one or more sensors that are each configured to detect the airflow proximate one or more containers.

Preferably, the supply system comprises a sensor that is configured to detect the temperature proximate the containers. Preferably, the supply system comprises one or more sensors that are each configured to detect the temperature proximate one or more containers.

Preferably, each of the sensors of the supply system is arranged to provide a signal to a controller that is arranged to control the supply system in response to the signal. In this way, the supply system comprises an environment control system that is arranged to control the carbon dioxide levels, airflow and/or temperature of the plants housed within the containers in use. The vertical farming apparatus of the present invention can therefore provide a controlled and optimal environment for the plants housed within the containers in use.

Preferably, the supply system is arranged to provide heat to the containers and the plant housed within the containers in use. That is, the air dispensed by the supply system is heated prior to it entering the gas conduits. By heating the plants in this way, the heat can be focused on the areas where it is needed most, i.e., in close proximity near the plants. This is much more energy and cost efficient than tradition methods of heating an entire glasshouse. The heated airflow from the supply system can also beneficially stimulate the plants, for example, by opening their stoma in the morning. In this preferred embodiment, typically air is heated and then pumped into the gas conduits of the supply system.

Preferably, the supply system is arranged to supply pressurized carbon dioxide, pressurized air or a pressurized mixture of carbon dioxide and air. By supplying pressurized gases, the amount of carbon dioxide and/or (heated) air supplied can be more accurately controlled and distributed to the containers.

Preferably, the irrigation system is configured to irrigate each of the containers directly. More preferably, the irrigation system is configured to irrigate each of the containers individually. In this way, the irrigation system is configured to be in close proximity to the containers such that each container is irrigated by its own portion of the irrigation. In other words, the irrigation system of this preferred embodiment does not comprise an overhead system, such as a sprinkler system, that sprays all of the containers together. Rather, the irrigation system of this preferred embodiment comprises multiple components, such as irrigation conduits, that each irrigate a different container individually. Since the containers are irrigated directly, the irrigation and flow of liquid nutrients can be tuned to suit the individual need of the plants within a specific container or on a specific gutter, thereby helping to provide a more optimal environment to the plants whilst simultaneously reducing the liquid consumption.

Preferably, the irrigation system comprises a plurality of irrigation conduits for irrigating the conduits. In use, the irrigation conduits irrigate the plants housed within the containers.

Preferably, the irrigation conduits extend in a direction substantially parallel with the longitudinal axis of the gutters in the array of gutters. It is preferable for the irrigation conduits to extend in this direction in order to supply liquid nutrient evenly along the length of the containers and gutters.

Preferably, each irrigation conduits is associated with a gutter in the array of gutters. "Associated with" is taken to mean that a specific irrigation conduit is arranged to irrigate a specific container.

Preferably, the associated irrigation conduit is located above its respective container. In this way, liquid nutrient that is dispensed from the irrigation conduit during use can irrigate the plants housed within the containers via gravity, thereby reducing energy and wastage.

Preferably, multiple irrigation conduits are associated with each gutter in the array of gutters. In this context, multiple conduits are arranged to irrigate a specific container. Having multiple conduits is beneficial for ensuring that the whole length and width of the container is evenly irrigated as the multiple irrigation conduits can compensate for differences between the other conduits.

Preferably, each of the associated irrigation conduits are located above their respective containers. In this way, liquid nutrient that is dispensed from the irrigation conduits during use can irrigated plants housed within the containers via gravity, thereby reducing energy and wastage from spraying. That is, the location of the irrigation conduits ensures even delivery along the length and width of the containers.

Preferably, each of the irrigation conduits is supported by the frame. In this way, the irrigation conduits can be positioned proximate to the containers, and this can reduce the number of components surrounding or associated with the vertical farming apparatus.

Preferably, the irrigation system is arranged such that the amount of liquid dispensed from each irrigation conduit can be controlled independently. This control is typically achieved by the provision of a controller within the irrigation system that it is arranged to control the pressure and volume of the liquid nutrient flowing through the irrigation conduits.

Preferably, the irrigation system comprises a sensor that is configured to detect the humidity proximate the containers. Preferably, the irrigation system comprises one or more sensors that are each configured to detect the humidity proximate one or more containers.

Preferably, the irrigation system comprises a sensor that is configured to detect the moisture content of the medium or substrate that is within the containers in use. Preferably, the irrigation system comprises one or more sensors that are each configured to detect the moisture content of the medium or substrate that is within one or more containers in use.

Preferably, each of the sensors of the irrigation system is arranged to provide a signal to a controller that is arranged to control the irrigation system in response to the signal. In this way, the irrigation system comprises an environment control system that is arranged to control the humidity and/or irrigation of the plants housed within the containers in use. The vertical farming apparatus of the present invention can therefore provide a controlled and optimal environment for the plants housed within the containers in use.

Preferably, each irrigation conduit is pressure compensated. Preferably, the pressure compensation is provided by a flow system that is arranged to allow a set flow of liquid nutrient to flow once a pressure threshold has been met.

Preferably, each container in the array of containers comprises a lid. Preferably, each container in the array of containers comprises a lid with one or more openings for plants to extend through. The openings allow sunlight to reach the plant before it has grown through the opening. The lids act to protect the substrate and root structure of the plant by, for example, helping to control the moisture and humidity of the substrate and root structure by limiting evaporation. Thus, the lids can reduce the water consumption of a plant grown in the vertical farming apparatus.

Preferably, the lid reversibly attaches to the container. In this way, the lid can be removed to plant or tend to the plants, to add substrate or maintain the plants.

Preferably, the lid is arranged to accept and accommodate the irrigation conduits in embodiments of the irrigation system comprising irrigation conduits. The lid acts as a cover to protect the plants and, as such, the lids can block some of the liquid nutrient being dispensed from overhead irrigation systems. In this preferred embodiment, this problem is overcome by positioning the irrigation conduit between the lid and the container or, in other words, the irrigation conduit extends through the space defined by the container and its lid. This positioning of the irrigation conduit improves the efficiency with which liquid nutrient is dispensed and the lid and container inhibit wastage of the liquid such that more is supplied to the substrate and plant in use.

Preferably, the irrigation conduits extend lengthwise over the containers and, thus, it is preferable that the lids comprise apertures, in addition to the openings, in order to accept and accommodate the irrigation conduits running underneath the lid.

The vertical farming apparatus and frame can further comprise the following optional features.

Preferably, each gutter in the array of gutters comprises a raised surface that is arranged to support one or more plant troughs or pots and a drainage surface below the raised surface that is arranged to accept drainage from the one or more plant troughs or pots that are supported by the raised surface in use. The gutters may advantageously comprise a raised surface for supporting the plant troughs or pots in use and a drainage surface below the raised surface. In use, the drainage surface is below the bottom of the container. Therefore, when the plants are irrigated the liquid nutrient drains through the container and onto the drainage surface of the gutter. This advantageously helps keep plants from being waterlogged and thereby improves root growth and helps prevent root rot.

The irrigation system may optionally comprise a fluid reservoir for storing liquid nutrient. The irrigation system may optionally comprise a pump, or the irrigation system can be gravity fed.

Each gutter in the array of gutters may have substantially the same dimensions as each of the other gutters in the array of gutters. By having each gutter in the array of gutters with the same dimensions the containers supported by the gutters can, in use, be moved between any or each gutter. Accordingly, the plants can be easily rearranged to sort by, for example, growth or ripening.

The offset in the first horizontal direction of each gutter to the other gutters in the lower formation of gutters may be equal to or greater than the width of said each gutter. Having an offset equal to or greater than the gutter may increase the amount of direct sunlight that plants supported by the lower formation of gutters receive with the trade-off of slightly decreasing plant density per unit area. Accordingly, it is envisaged that such an embodiment would be used predominantly for crops that require more direct sunlight.

Alternatively, the offset in the first horizontal direction of each gutter to the other gutters in the formation of gutters may be less than the width of said each gutter. Decreasing the horizontal offset to be below the width of the gutter may increase plant density per unit area with the trade-off of slightly decreasing the amount of direct sunlight that the plants supported by the lower formation of gutters receive. Accordingly, it is envisaged that such an embodiment would be used predominantly for crops that prefer shady conditions and/or where land usage is a key factor The gutters in the array of gutters may be all aligned in a second horizontal direction. The second horizontal direction may be perpendicular to the first horizontal direction in which the gutters in the lower formation are offset. Aligning the gutters in the second horizontal direction may help to reduce the footprint of the apparatus and thereby increase plant density in use.

A gutter in the upper formation of gutters may be centrally aligned with the frame along both the first horizontal direction and the second horizontal direction. Alternatively, the gutter in the upper formation of gutters may be centrally aligned with the frame along only one of said horizontal directions. A first gutter in the upper formation of gutters may be centrally aligned with a second gutter in the upper formation along one or both of the first and second horizontal directions. Alternatively or additionally, a gutter in the upper formation of gutters may be centrally aligned with an uppermost gutter in the lower formation of gutters along one or both of the first and second horizontal directions.

Both the frame and the array of gutters may be symmetrical along a plane orthogonal to the first horizontal direction. In this way, the frame and array of gutters may comprise a plane of symmetry. Both the frame and the array of gutters may be symmetrical along a plane orthogonal to the second horizontal direction. The frame and array of gutters may be symmetrical along both planes. The frame may be an A-frame. The frame may be less than 2.5 metres tall. In this way, crops grown on the apparatus may be harvested without the need for sophisticated equipment suitable for working at height and the associated safety systems required.

The tiered configuration of the lower formation of gutters may resembles a V-shape or chevron. In this way, the offset in the first horizontal direction between the gutters above and/or below any gutter in the lower formation is equal. The upper and lower formation of gutters may resemble a rocket shape.

Each gutter may be rectilinear. In this way, the plants grown thereon may be arranged rectilinearly such that harvesting and other labor-intensive activities are able to be carried out efficiently.

The frame may comprise a first sub-frame and a second sub-frame and each gutter in the array of gutters may be supported by both the first sub-frame and second sub-frame simultaneously. The first sub-frame and the second sub-frame may not be connected or attached except by the gutters.

Each gutter in the array of gutters may be removable from frame. In this way, the gutters and containers that they support in use may be moved to a different position on the frame and cleaned. Furthermore, the gutters may have a shorter life span than the frame and making the gutters removable may increase the lifespan of the apparatus as whole.

The gas conduits may be arranged that is arranged to supply gaseous carbon dioxide to two or more gutters in the array of gutters in a series configuration. Having a conduit arranged in a series configuration may reduce the complexity of the system to supply the carbon dioxide.

Alternatively, or additionally, the apparatus may comprise two or more gas conduits that are arranged to supply gaseous carbon dioxide to two or more gutters in the array of gutters in a parallel configuration. Having conduits connected in a parallel configuration may mean that it is easier to ensure an even pressure of the gaseous carbon dioxide inside the two or more conduits in use and, therefore, a more even supply of carbon dioxide to the gutters in the array of gutters.

The irrigation lines may be arranged to supply water to two or more gutters in the array of gutters in a series configuration. Having a conduit arranged in a series configuration may reduce the complexity of the system to water and/or feed the plants in use.

Alternatively, or additionally, two or more irrigation lines may be arranged to supply water to two or more gutters in the array of gutters in a parallel configuration. Having irrigation lines connected in a parallel configuration may mean that it is easier to ensure an even water pressure inside the two or more irrigation lines in use and, therefore, a more even supply of water to the gutters in the array of gutters.

The apparatus may comprise a system for collecting and treating the drainage from the array of gutters. The collected and treated water may be supplied to the irrigation lines for resupply to the gutters. In this way, water waste may be reduced.

The frame may comprise a curved support member with curved portions arranged in a tiered configuration that support at least the lower formation of gutters. The frame may further comprise an upper support member that is supported by the curved support member. The upper support members may support one or more of the gutters of the upper formation of gutters.

The frame may comprise a vertical support member that extends from the base and supports at least the upper formation of gutters.

The frame may comprise one or more horizontal support members that extend from the vertical support member. Each horizontal support member may support a gutter from the lower formation of gutters.

The frame may comprise an insect habitat support for supporting a habitat for insects. The apparatus may comprise a habitat for insects. The habitat may only be suitable for insects that are deemed beneficial to the crop that is being farmed in use.

The apparatus may be arranged and/or configured for vertically farming strawberries. However, the farming of other crops is also envisaged.

In use, the containers may contain a growing or growth medium or substrate therein. The growing medium may be inert and may have zero ionic charge, which has been found to aid plant growth. The growing medium may comprise a clay ball substrate. Additionally, or alternatively, the growing medium may comprise any other known growing substrate such as perlite, vermiculite, mineral wool, or coir. The growing medium may be free draining. The growing medium may be recycled or reused.

Alternatively, the containers may be configured and arranged for the hydroponic growing of plants.

Typically, the vertical farming apparatus will be positioned within a grow room in use. The grow room may comprise a transparent or semi-transparent outer surface. The grow room may comprise a light diffusing outer surface. The grow room may be a green house, a poly tunnel, or any other known suitable structure. The grow room may be configured to control the heat, humidity, and air movement therein.

According to a second aspect there is provided one or more containers for housing strawberry plants and a supply system that is arranged to supply gaseous carbon dioxide, air and mixtures of carbon dioxide and air to the containers.

A second aspect of the invention may comprise any of the preferred features of the first aspect, especially those relating to the gas system gas conduits, containers, lid, irrigation system, and irrigation conduits.

According to a third aspect of the present invention there is provided a vertical farming method, the method comprising providing a frame for supporting gutters; providing gutters on the frame; providing containers on the gutters; providing an irrigation system for irrigating plants; supplying gaseous carbon dioxide to the containers via a supply system; and providing an airflow around the containers using the supply system.

In use, the containers will comprise plants and a substrate. The irrigation system will irrigate the plants and the supply of gaseous carbon dioxide and airflow will provide the advantages as discussed in relation to the first aspect.

Preferably, the airflow creates temperature differentials around the containers. This is beneficial for heating and/or stimulating the plants.

In this specification, a "vertical farming system" and a "vertical farming apparatus" are used interchangeably and are taken to have the same meaning.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 3 is an end cross-sectional view of a portion of the third vertical farming apparatus of FIG. 1a;

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
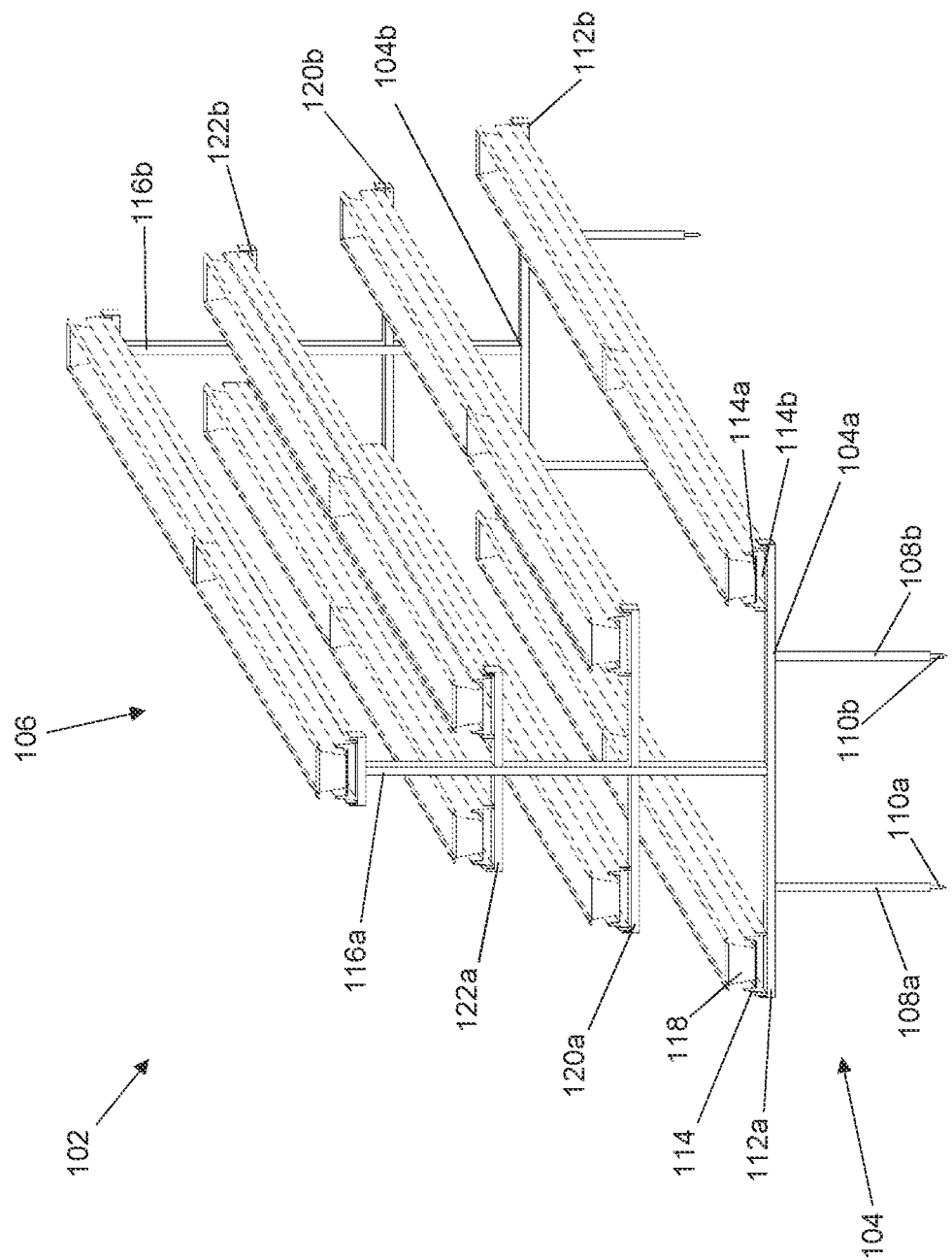
FIG. 1 is a perspective view of a portion of a vertical farming apparatus in accordance with the present invention.

FIG. 1a is a schematic of a vertical farming apparatus 2 in accordance with the present invention. The vertical farming apparatus 2 comprises a frame 4 for supporting the plants 5 that are to be farmed, e.g. strawberries and bell peppers, in a tiered configuration. The structure of frames in accordance with the present invention are discussed in detail below in relation to FIGS. 2 to 5.

To support the plants 5, the apparatus 2 comprises an array of gutters 6 that are also in a tiered configuration, where each gutter 6 in the array of gutters 6 supports a container 8 for housing the plants 5. Accordingly, the containers 8 and the plants 5 housed therein are also arranged in a tiered configuration. In this embodiment, the containers 8 are plant troughs and it is envisaged that other suitable containers such as plant pots, plant bags or hydroponic systems could be used. The tiered configuration of the gutters 6 is beneficial as the horizontal offset allows the plants 5 on the lower levels of the tiered configuration to receive more sunlight as the upper levels block less sunlight from reaching them compared to a vertical configuration.

The containers 8 each comprise a lid 9. The lids 9 have a substantially triangular top portion, with a series of apertures (not shown) in the faces of the sides of the triangle. The series of apertures allow the plants 5 to grow unimpeded. The lids 9 assist in regulating the conditions of the medium or substrate (e.g. soil and compost) in which the plants 5 are growing in the containers 8 as they provide a enclosed environment bar the apertures and openings. For example, the lids 9 can help regulate humidity by reducing evaporation from the substrate or medium. In other embodiments, the containers 8 are provided without lids 9, for example, where the containers 8 are grow bags.

The vertical farming apparatus 2 further comprises an irrigation system 11. The irrigation system 11 may comprise a pump (not shown) and/or reservoir for supplying a liquid nutrient, such as water or liquid plant food to irrigation conduits 13. In this embodiment, the irrigation system 11 comprises irrigation conduits 13 for irrigating plants 5 that are housed within the containers 8. Other embodiments are envisaged where the plants 5 are watered by sprinklers, for example.

The irrigation conduits 13 extend above the containers 8 and are arranged to supply liquids, such as water, liquid nutrient or plant food, to the plants 5 housed within the containers 8. In this embodiment, two irrigation conduits 13 extend above each container 8 and gutter 6 in a direction substantially parallel with the longitudinal axis of the containers 8 and gutters 6. It has been found that two irrigation conduits 13 is particularly beneficial for providing an even supply along the length of the container and across the width of the container 8. However, other numbers of irrigation conduits 13 per container 8 are envisaged.

The irrigation conduits 13 are housed between the lid 9 and the container 8, with each container 8 and lid 9 being associated with two irrigation conduits 13. The irrigation conduits 13 extend through openings 15 in either end of the lid 9 to connect to the remainder of the irrigation system 11, such as the pump and/or reservoir. In this embodiment, the size of the rectangular openings 15 is designed to be complementary in size to the irrigation conduits 13 such that the lids 9 act to hold the irrigation conduits 13 in place and prevent them from moving and disturbing the plants. The irrigations conduits 13 can be connected to the remainder of the irrigation system in series or, as is preferred, in parallel. In the parallel configuration, the amount of liquid supplied to each irrigation conduit 13 is controllable by a controller (not shown) such that the amount of liquid supplied by the irrigation conduit 13 can be configured for each container 13 individually. Positioning the irrigation conduits 13 between the container 8 and the lid 9 has been found to be particularly beneficial as the lid 9 can act a barrier to prevent wastage.

The vertical farming apparatus 2 further comprises a supply system 17 that is arranged to supply, gaseous carbon dioxide, air and mixtures of gaseous carbon dioxide and air to the containers 8 and plants 5 housed therein. In this embodiment, the supply system 17 comprises gas conduits 19 that are located underneath each of the gutters 6 and are attached to the underside of each gutter 6. The gases are typically pumped into the gas conduits 19 form a reservoir. Thus, each gutter 6 has a gas conduit 19 associated with it. The gas conduits 19 can be positioned anywhere on the frame 4 that is suitable for supplying gases to the plants 5 within its associated container 8. In this embodiment, the gas conduit 19 is underneath the gutter 6 and container 8 as the gases supplied by the supply system 17 are typically heated by a heater (not shown) prior to being dispensed. In other envisaged embodiments the gas conduits 19 are located above the container 8 and lid 9 or between the container 8 and 9.

The supply system 17 is arranged such that the gaseous carbon dioxide, air or a mixture thereof can be interchangeably pumped in the gas conduits 19. That is, the supply system 17 can be controlled such that the gas dispensed by it is controlled. In this way, the gas dispensed can be controlled based on the needs or conditions of the plants 5.

The gas conduits 19 in this embodiment are lay flat tubes, but other types of tubing or conduits are also envisaged. The gas conduits 19 comprise micro holes along their length and width that allows the gas being dispensed from the gas conduits 19 to be evenly dispensed along the length and width of the container 8.

FIG. 1b depicts the first vertical farming apparatus 2 with an alternative arrangement of gas conduits 19. In this embodiment, in addition to the gas conduits 19 under each gutter 6, additional are provided between the lower containers 8. These additional gas conduits 19 are centrally aligned with the frame 4 such that they are all parallel and lie on the same plane. In this embodiment, the gas conduits 19 are supported on supports 21 that extend from the frame 4.

As such, the lower gutters 6 and their associated containers 8 have the supply system 17 and gas conduit 19 between them such that they share the gas conduit 19 in addition to the gas conduit 19 underneath the gutter. Or, in other words, these additional gas conduits 19 supply gas to two containers each. This can be particularly advantageous for supplying air and carbon dioxide to the containers 8 simultaneously. For example, the centrally aligned gas conduits 19 can provide air to generate an airflow or heat the plants and the gas conduits 19 underneath the gutters 6 can provide carbon dioxide to the plants. The amount of gas dispensed from these so-called shared gas conduits 19 can be increased to compensate for that fact that they need to supply multiple containers 8 with gases.

FIGS. 2 to 5 each depict part of a vertical farming system 102, 202, 302, 402 in accordance with the present invention. In particular, the FIGS. 2 to 5 each depict a frame 104, 204, 4 and 404 of the vertical farming systems 102, 202, 302, 402, where the frame 104, 204, 4 and 404 is supporting an array of gutters 106, 206, 306, 406. The array of gutters 106, 206, 306, 406 support containers 118, 218, 318, 418 for housing plants. The other components of the vertical farming system 102, 202, 302, 402, such as the irrigation system 11 and the supply system 17, have been omitted from FIGS. 2 to 5 for clarity. These components of the vertical farming apparatus have been discussed in detailed above and can be applied to the frames 104, 204, 4 and 404 from FIGS. 2 to 5.

Figure 2:
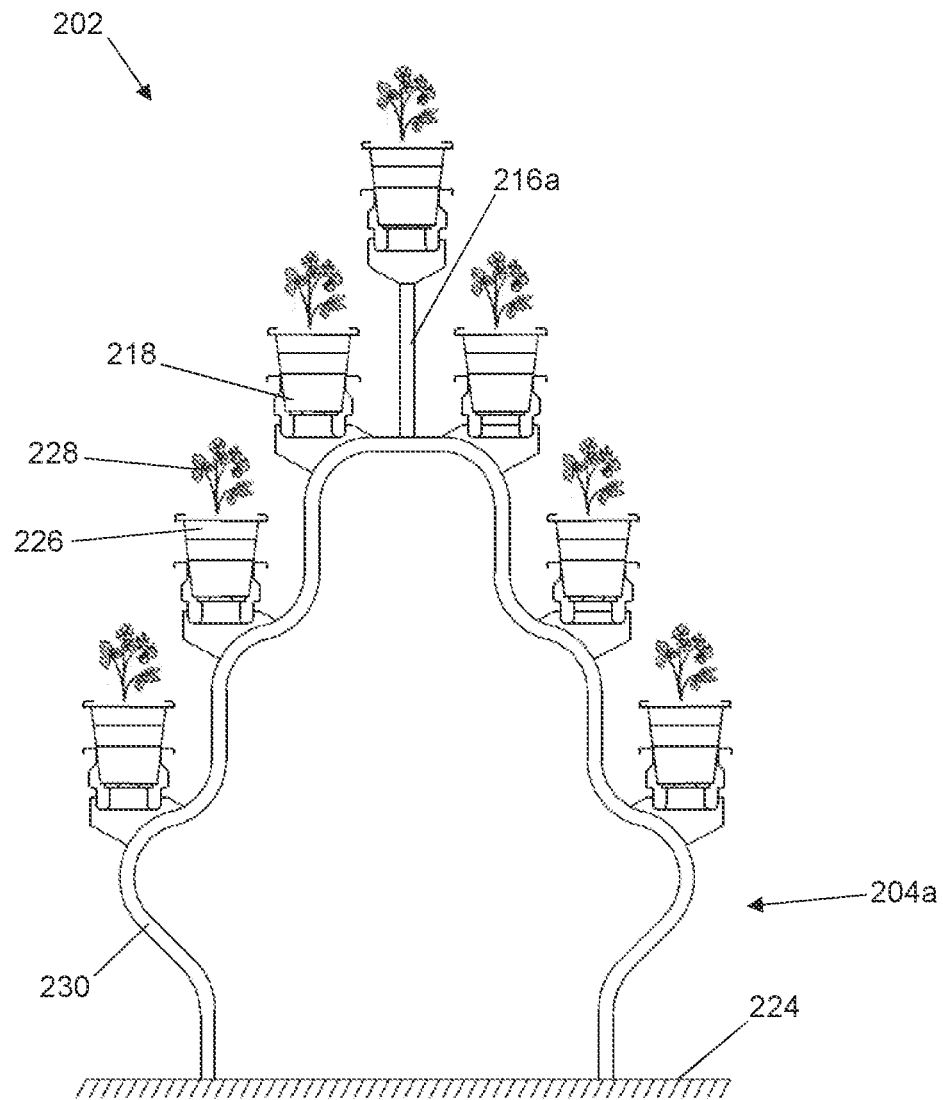
FIG. 2 is an end cross-sectional view of a portion of a second vertical farming apparatus.

FIG. 2 is a perspective view of a portion of a second vertical farming apparatus 102. The irrigation system and supply system of the present invention are omitted for clarity. The second vertical farming apparatus 102 comprises a frame 104 on which an array of gutters 106 is supported. The frame 104 comprises a first sub-frame 104a and a second sub-frame 104b that are substantial identical in shape, size and configuration and are separate and not directly connected to one another.

The first sub-frame 104a and the second sub-frame 104b each comprise two legs 108a, 108b that act as a base for supporting the frame 104 on a surface. The legs 108a, 108b resemble rods or poles. In use, the each of legs 108a, 108b extend in a vertical direction that is perpendicular to the ground. Each of the four legs 108a, 108b comprises a pin 110a, 110b for inserting into the ground to removably fix the frame 104 in position. Other methods of attaching the frame to the ground are envisaged such as tie-lines or providing apertures for receiving fixings. The legs 108a, 108b may be extendable to allow their height to be adjusted such that the sub-frames 104a, 104b and therefore the frame 104 can be levelled on uneven surfaces. Furthermore, it is envisaged that the legs 108a, 108b may optionally comprise wheels or castors such that the frame 104 may be wheeled along the surface to move the frame 104.

Each sub-frame 104a, 104b further comprises a lower support member 112a, 112b. The lower support members 112a, 112b are beam-like or rod-like and are attached to both their respective legs 108a, 108b of the base. The lower support members 112a, 112b extend in a direction substantially perpendicular to their respective legs 108a, 108b and in a horizontal direction substantially parallel to the surface on which the base is supported. The lower support members 112a, 112b are longer than the gap between the legs 108a, 108b such that they extend to the sides of their respective sub-frame 104a, 104b.

Two gutters 114 are supported by the lower support members 112a, 112b and extend between the lower support members 112a, 112b. The gutters 114 are supported by opposing ends of the lower support members 112a, 112b and extend in a direction substantially perpendicular to the longitudinal axis for the first lower support member 112a to the second lower support member 112b. The gutters 114 resemble trays and comprise a raised surface 114a that in use supports a plant trough 118. The plant troughs 118 are removeable from the gutters 114.

The gutters 114 further comprise a drainage surface 114b beneath the raised surface 114a. In use, the drainage surface 114b receives and collects drainage from the plant troughs 118 above. Raising the plant trough 118 from the drainage surface 114b of the gutter 114 using the raised surface 114a helps to improve root growth and drainage from the plant trough 118.

Both sub-frames 104a, 104b comprise a vertical support member 116a, 116b that is beam-like or rod-like and that extend from the middle of its respective lower support member 112a, 112b, i.e., the vertical support members 116a, 116b extend from a position equally distanced between the two ends of lower support member 112a, 112b and their supported gutters 114. The vertical support members 116a, 116b extends in a direction parallel with the legs 108a, 108b of the frame 104. At the top of each vertical support member 116 another gutter 114 for supporting a plant trough 118 is provided.

Each sub-frame 104a, 104b, further comprises a middle support member 120a, 120b, and an upper support member 122a, 122b that both extend from their respective vertical support members 116a, 116b in a direction substantially parallel with the lower support members 112a, 112b and perpendicular to the vertical support members 116a, 116b.

The middle support members 120a, 120b and the upper support members 122a, 122b are similar to the lower support members 112a, 112b in that are beam-like or rod-like and that each support member 112a, 112b, 120a, 120b, 122a, 122b supports two gutters 114 at positions adjacent to or proximate their ends. The lower support members 112a, 112b, the middle support members 120a, 120b and the upper support members 122a, 122b are offset vertically from one another by at least the height of the plant trough 118 supported by the gutter 114. In the arrangement depicted in FIGS. 1a and 1b, the vertical offset between the support members 112a, 112b, 120a, 120b, 122a, 122b is approximately the height of the plant that will be grown in the plant trough 118. Accordingly, different frames 104 may be designed and proportioned for different crops.

Figure 3:
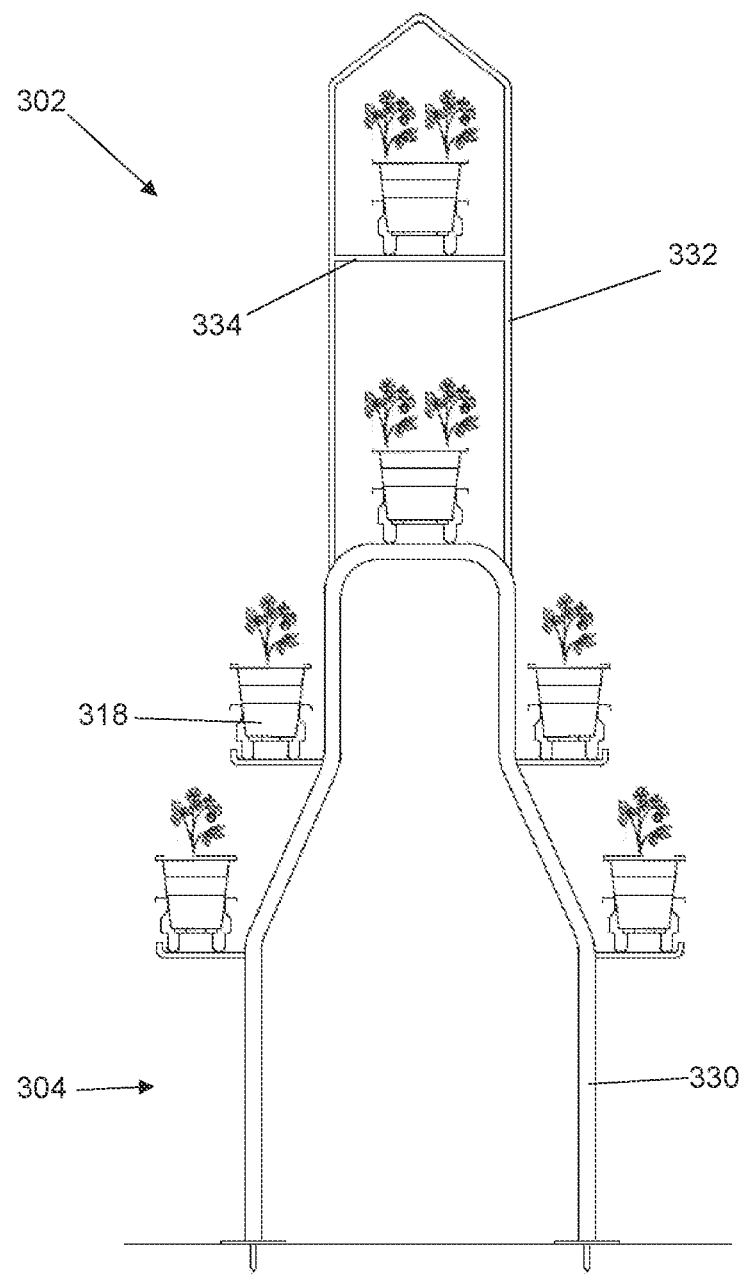

The middle support members 120a, 120b are longitudinally shorter than the lower support members 112a, 112b and the upper support members 122a, 122b are longitudinally shorter than the middle support members 120a, 120b. This disparity in length gives the gutters 114 supported by the support members 112a, 112b, 120a, 120b, 122a, 122b a tiered configuration that resembles a V-shape or a chevron. Or, in other words, the gutters 114 supported by one support member 112a, 112b, 120a, 120b, 122a, 122b are horizontally offset from the gutters 114 supported by another supported member 112a, 112b, 120a, 120b, 122a, 122b. The six gutters 114 supported by the support members 112a, 112b, 120a, 120b, 122a, 122b may be a lower formation of gutters 114 and the gutter 114 supported by the vertical support members 116a, 116b may be an upper formation of gutters 114. Other numbers of gutters are envisaged. Although only one gutter 114 is shown as the upper formation, more than one gutter may be provided, as shown in FIG. 3. Together, the lower formation and upper formation form an array of gutters. Each gutter 114 in the array of gutters is horizontally offset from each other gutter 114 in the array of the gutters. One key aspect is achieving this horizontal offset between the gutters 114, and plant troughs 118, to allow vertical access to sunlight for the plants contained within the plant troughs 118 in use. Other frame designs can be used to achieve this and are envisaged.

The frame 104 is symmetrical about two planes. In total, the frame 104 of the second vertical farming apparatus 102 is shown to support seven plant troughs 118 thereon.

One of the sub-frames 104a, 104b may be positioned vertically lower than the other. Alternatively, or additionally, the gutters 114 may be arranged such that the drainage surface 114b falls away from the raised surface 114a along a length of the gutter 114. In this way, water draining into a gutter 114 may travel along a length of the gutter by gravity.

FIG. 3 is an end cross-sectional view of a portion of a third vertical farming apparatus 202. The third vertical farming apparatus 202 is shown positioned on the ground 224. The third vertical farming apparatus 202 is also shown to support seven plant troughs 218 thereon, in the same arrangement and orientation as the first vertical farming apparatus 102 shown in FIGS. 1a and 1b. In this depiction, plant pots 226 and strawberry plants 228 are shown in position in the plant troughs 218.

Although the third vertical farming apparatus 202 is shown to support seven plant troughs 218 thereon in the same arrangement and orientation and the first vertical farming apparatus, the frame is different. The frame includes two sub-frames 204a (second sub-frame not shown) that include a curved frame member 230 which performs the roles of all frame members of the first vertical farming apparatus 102 except the vertical support members 116a, 116b. As such, the curved frame member 230 is configured to support six plant troughs 218 thereon, three on each side. The sub-frame 204a includes a vertical support member 216a which extends vertically from an upper central portion of the curved frame member 230 and supports a single plant trough 218 thereon.

The frame 204 is symmetrical about two planes. The use of a single curved frame member 230 reduces the need for joins or attachments between frame members, which may simplify construction and improve longevity.

Figure 4:
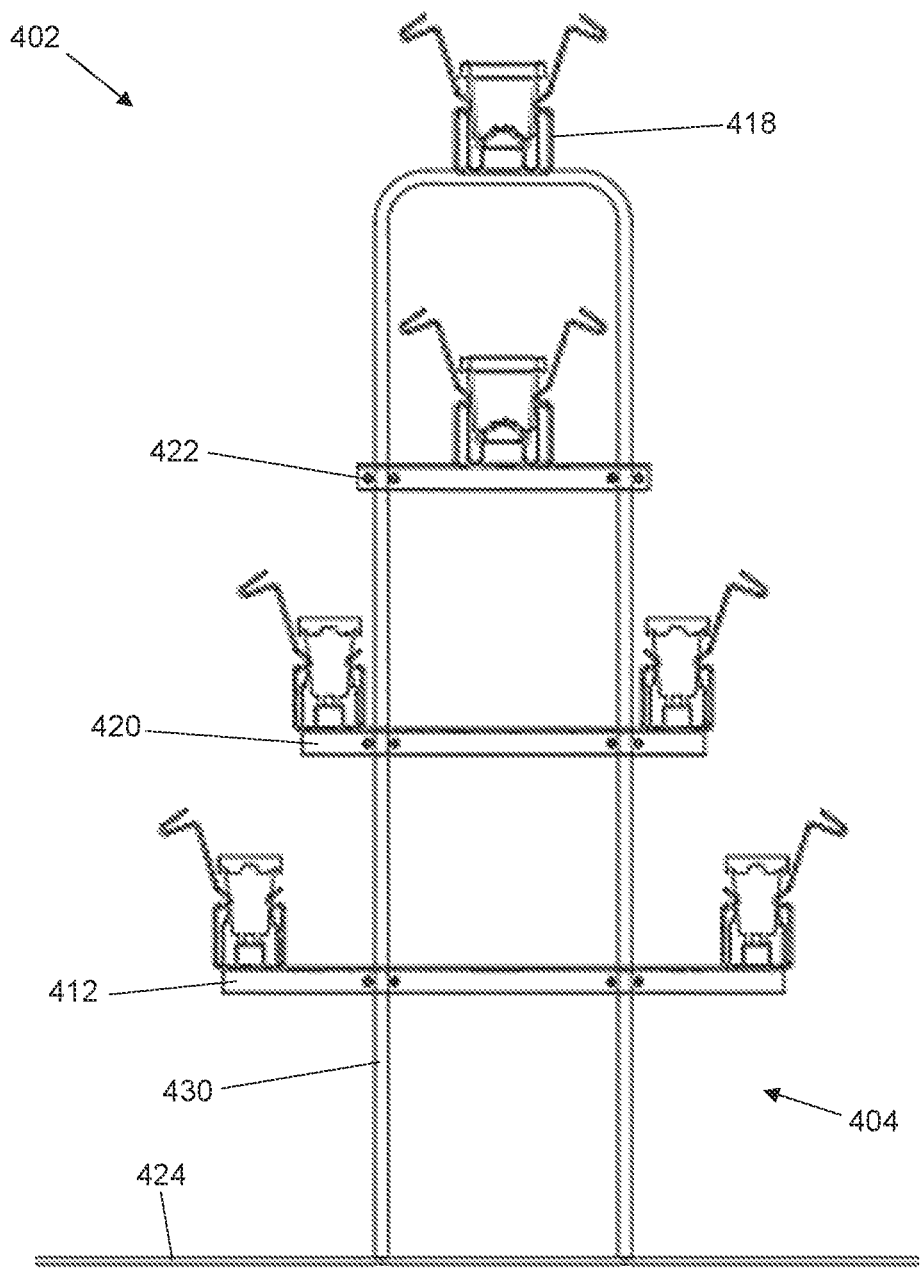
FIG. 4 is an end cross-sectional view of a portion of a fourth vertical farming apparatus in accordance with the present invention.

FIG. 4 is an end cross-sectional view of a portion of a fourth vertical farming apparatus 302. The fourth vertical farming apparatus is similar in structure and design to the first vertical farming apparatus except that it does not comprise any lids. As such, the description of the fourth vertical farming apparatus 302 also applies to the first vertical farming apparatus 2. The fourth vertical farming apparatus includes a curved frame member 330 that is similar to the curved frame member 230 of the first vertical farming apparatus 202. Although similar, the curved frame member 330 of the first vertical farming apparatus 302 is configured to support five plant troughs 318, two on each side and one on top.

Furthermore, the frame 304 includes an upper member 332 configured to support a plant trough 318 directly above the plant trough 318 supported on top of the curved frame member 330. The upper member 332 has a substantially inverted U-shaped and is attached at each end to the curved frame member 330. The upper member 332 includes a cross member 334 that extends between the two legs of the inverted U-shape and supports the plant trough 318 thereon. This upper member 332 may be incorporated into the first vertical farming apparatus 102 or the second vertical farming apparatus 202 to provide another plant trough directly above and in line with the uppermost plant trough shown in FIG. 1a, FIG. 1b and FIG. 2 respectively.

Figure 5:
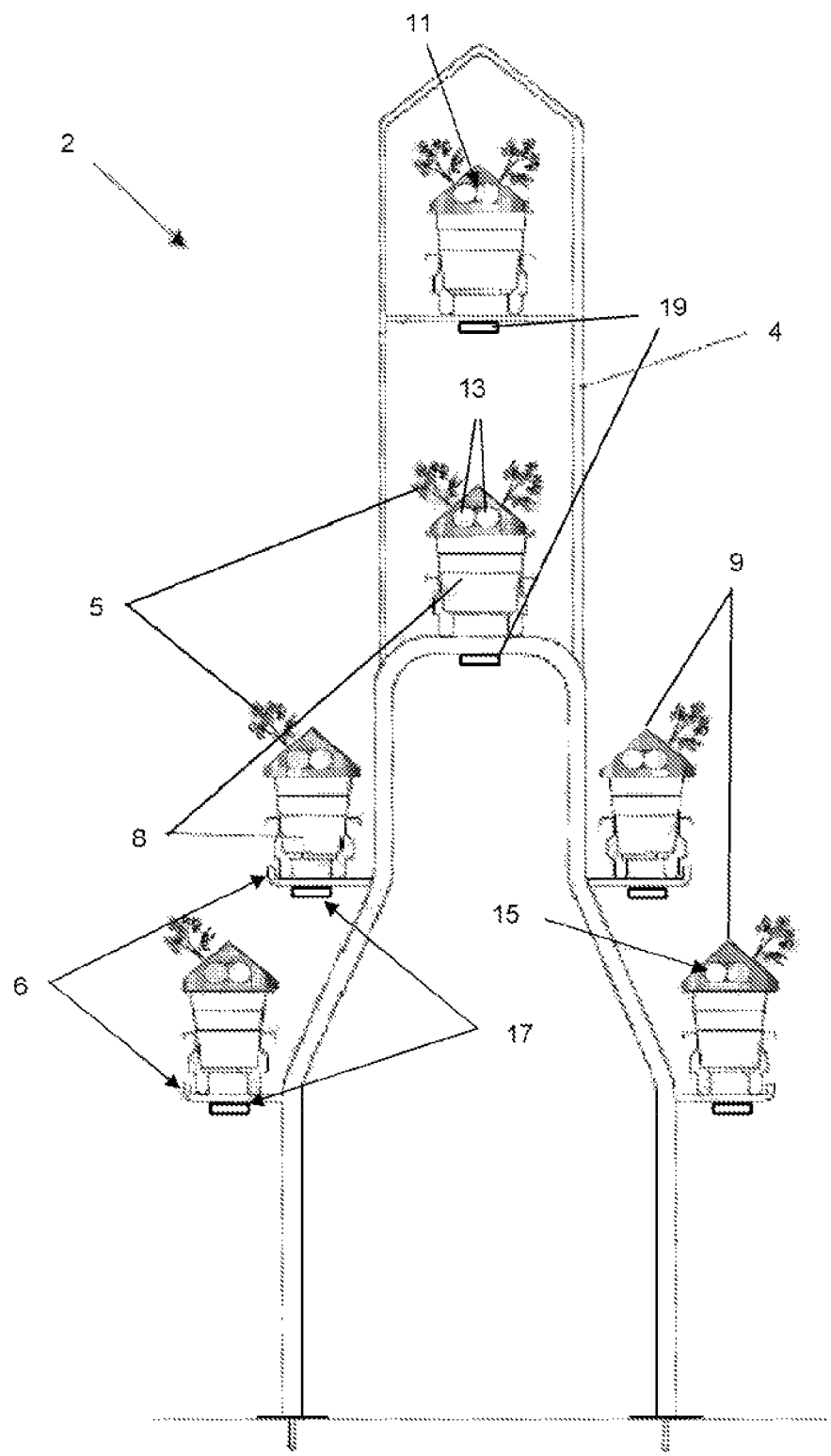
FIG. 5 is an end cross-sectional view of a portion of a fifth vertical farming apparatus in accordance with the present invention.
Figure 6:
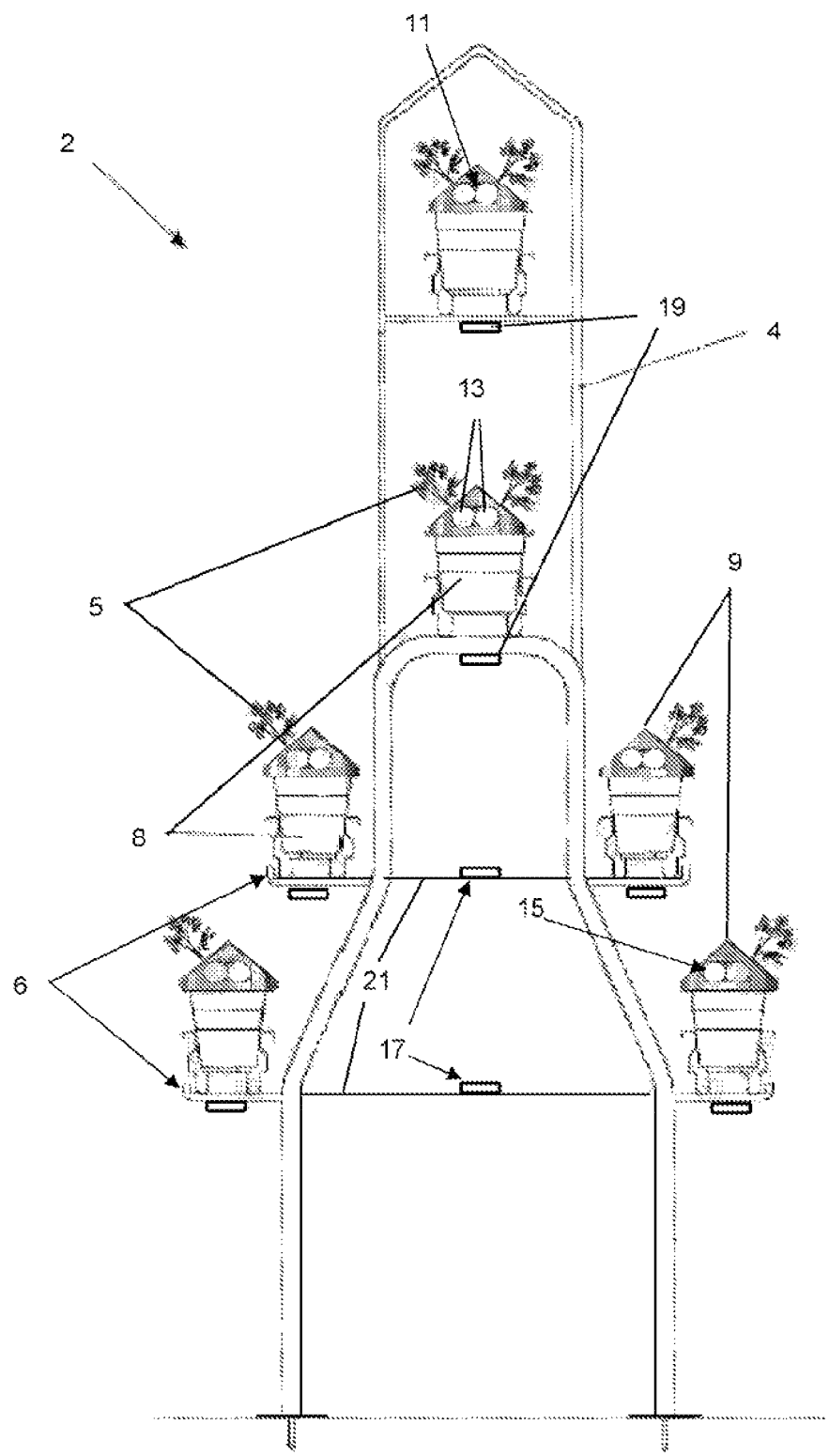
FIG. 6 is an end cross-sectional view of a portion of a sixth vertical farming apparatus in accordance with the present invention.

FIG. 5 is an end cross-sectional view of a fourth vertical farming apparatus 402. The fourth vertical farming apparatus 402 includes a frame 404 configured to support six plant troughs 418 in a similar arrangement to the third vertical farming apparatus shown in FIG. 4. The frame 404 includes a generally inverted U-shaped frame member 430 that is shown to have two legs extending to the ground 424 and is also shown to support an uppermost plant trough 418 at the other end thereof.

The frame 404 also includes a lower support member 412, a middle support member 420 and an upper support member 422 similar to those of the first vertical farming apparatus shown in FIG. 1a. Each of the support members 412, 420, 422 are oriented horizontally. The upper support member 422 extends between the two legs of the U-shaped frame member 430 and supports a plant trough 418 between the two legs, immediately below the uppermost plant trough 418. The upper support member 422 is shown to have a length that is substantially the same as a width between the two legs of the U-shaped frame member 430 such that it does not extend substantially beyond the two legs.

The middle support member 420 has a greater length than the upper support member 422 and extends a first distance either side of the legs of the U-shaped frame member 430. Plant troughs 418 are shown to be supported outside of each leg of the U-shaped frame member 430 adjacent to the U-shaped frame member 430. The lower support member 412 has a greater length than the upper support member 422 and the middle support member 420 and extends a second distance, greater than the first distance, either side of the legs of the U-shaped frame member 430. Plant troughs 418 are shown to be supported adjacent to the ends of the lower support member 412 and therefore outside of each leg of the U-shaped frame member 430 and spaced from the U-shaped frame member 430.

The support members 412, 420, 422 support plant troughs 418 in a substantially inverted V-shape or chevron shape, below the uppermost plant trough 418. Furthermore, the support members 412, 420, 422 may be releasably attached to the U-shaped frame member 430 such that their relative positions may be adjusted. This may be advantageous because plants generally increase in size as they grow and therefore require a greater spacing.

Although six or seven plant troughs are shown in the Figures, it is envisaged that any number of plant troughs may be provided. The frames may be arranged with more or less support members depending on the number of troughs to be supported. The apparatus, and therefore the plant troughs, may have any longitudinal length. Although some of the figures depicts a rectilinear apparatus, the apparatus may be curved to fit a curved room or the like. Furthermore, although some degree of spacing and scale may be inferred from the Figures, it is envisaged that any suitable spacing or apparatus size may be provided, which may be dependent on the crop being farmed. The apparatus may also comprise irrigation lines, conduits for conveying gaseous carbon dioxide to the plants and/or any other feature described herein.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A vertical farming apparatus, the apparatus comprising:
a plurality of plant containers;
a frame for supporting the plurality of plant containers,
a base for supporting the frame,
an array of gutters supported by the frame, the array of gutters comprising an upper formation of gutters above a lower formation of gutters, each container of the plurality of containers being supported by and arranged to drain into a gutter in the array of gutters; and
an irrigation system that is arranged to irrigate the containers, the irrigation system comprising a plurality of irrigation conduits for irrigating the containers, each irrigation conduit extending in a direction substantially parallel with a longitudinal axis of a corresponding gutter in the array of gutters;
wherein each container in the plurality of containers comprises a lid with one or more openings for plants to extend through; and
wherein, for at least one container, the irrigation conduit is configured to extend across the container between a top surface of the lid and a top surface of a substrate arranged in the container in a substantially horizontal direction;
said apparatus further comprising a supply system that is arranged to supply gaseous carbon dioxide, air and mixtures of carbon dioxide and air to the containers interchangeably.

2. The vertical farming apparatus of claim 1, wherein the supply system is configured to supply gases to each of the containers directly.

3. The vertical farming apparatus of claim 1, wherein each of the at least one gas conduits is supported by the frame.

4. The vertical farming apparatus of claim 1, wherein each of the at least one gas conduits are lay flat tubes.

5. The vertical farming apparatus of claim 1, wherein the supply system is arranged to control the carbon dioxide level around the array of containers.

6. The vertical farming apparatus of claim 1, wherein the supply system is arranged to provide heat to the containers and the plant housed within the containers in use.

7. The vertical farming apparatus of claim 1, wherein the supply system is arranged to supply pressurized carbon dioxide, pressurized air or a pressurized mixture of carbon dioxide and air.

8. The vertical farming apparatus of claim 1, wherein the irrigation system is configured to irrigate each of the containers directly.

9. The vertical farming apparatus of claim 1, wherein each of the plurality of irrigation conduits is associated with a gutter in the array of gutters.

10. The vertical farming apparatus of claim 9, wherein the associated irrigation conduit is located between an upper perimeter of its respective container and the lid of its respective container.

11. The vertical farming apparatus of claim 9, wherein multiple irrigation conduits are associated with each gutter in the array of gutters.

12. The vertical farming apparatus of claim 1, wherein each of the irrigation conduits is supported by the frame.

13. The vertical farming apparatus of claim 1, wherein the irrigation system is arranged such that the amount of liquid dispensed from each irrigation conduit can be controlled independently.

14. The vertical farming apparatus of claim 1, wherein each irrigation conduit is pressure compensated.

15. The vertical farming apparatus of claim 1, wherein each of the irrigation conduits is disposed between an associated lid and a substrate received within an associated container of the plurality of containers.

16. The vertical farming apparatus of claim 1, said apparatus comprising one or more containers for housing strawberry plants and a supply system that is arranged to supply gaseous carbon dioxide, air and mixtures of carbon dioxide and air to the containers.

17. A vertical farming apparatus, the apparatus comprising:
a plurality of plant containers;
a frame for supporting the plurality of plant containers,
a base for supporting the frame,
an array of gutters supported by the frame, the array of gutters comprising an upper formation of gutters above a lower formation of gutters, each container of the plurality of containers being supported by and arranged to drain into a gutter in the array of gutters; and
an irrigation system that is arranged to irrigate the containers, the irrigation system comprising a plurality of irrigation conduits for irrigating the containers, each irrigation conduit extending in a direction substantially parallel with a longitudinal axis of a corresponding gutter in the array of gutters;
wherein each container in the plurality of containers comprises a lid with one or more openings for plants to extend through; and
wherein each lid is arranged to receive one of the plurality of irrigation conduits and to maintain the received irrigation conduit in parallel with the longitudinal axis of the corresponding gutter in the array of gutters;
said apparatus further comprising a supply system that is arranged to supply gaseous carbon dioxide, air and mixtures of carbon dioxide and air to the containers interchangeably;
wherein the supply system comprises at least one gas conduit for supplying gases to the containers; and
wherein each of the at least one gas conduits extends in a direction substantially parallel with a longitudinal axis of the gutters in the array of gutters.

18. A vertical farming apparatus comprising:
a plurality of plant containers, each plant container comprising a lid with at least one opening for a plant to extend through;
a frame for supporting the plurality of plant containers,
an array of gutters supported by the frame, the array of gutters comprising an upper formation of gutters above a lower formation of gutters, each container of the plurality of containers being supported by and arranged to drain into a gutter in the array of gutters; and
an irrigation system comprising a plurality of irrigation conduits for irrigating the containers, each irrigation conduit being received within and along an associated lid and extending in a direction substantially parallel with a longitudinal axis of a corresponding gutter in the array of gutters.

* * * * *